United States Patent Office 3,594,350
Patented July 20, 1971

3,594,350
ESTERIFICATION OF TEREPHTHALIC ACID WITH AN ALKYLENE GLYCOL IN THE PRESENCE OF AMMONIA OR AN AMMONIUM SALT OF A DIBASIC CARBOXYLIC ACID
Robert A. Lofquist, Richmond, and Lamberto Crescentini and Laszlo J. Balint, Chester, Va., assignors to Allied Chemical Corporation, New York, N.Y.
No Drawing. Filed Oct. 6, 1969, Ser. No. 864,181
Int. Cl. C08g *17/013;* C07c *69/82*
U.S. Cl. 260—75
12 Claims

ABSTRACT OF THE DISCLOSURE

The esterification of polycarboxylic acid with an alkylene glycol is described under conditions of direct esterification wherein the polycarboxylic acid is esterified with an alkylene glycol in the presence of ammonia or an ammonium salt of a dibasic carboxylic acid.

BACKGROUND OF THE INVENTION

This invention relates to a process for preparing linear polyesters. More particularly, it relates to an improved process for directly providing esters in the presence of ammonia or an ammonium salt of a dibasic carboxylic acid which can then be polycondensed into high molecular weight and high quality linear polyesters or copolyesters suitable for processing into fibers, films and other shaped articles as a continuous or discontinuous process.

Polyesters are presently produced on a commercial scale by either an ester interchange reaction between dimethyl terephthalate and alkylene glycol or a so-called direct esterification method whereby a polycarboxylic acid is reacted directly with a polyol. In an effort to overcome the difficulties of an unreasonably slow process and a product of such inferior quality as to be substantially unusable, considerable effort has been and is currently being extended in an effort to improve the latter type process. One reason for the inferior quality is the presence of ether groups within the polymer chain which yields poor results when such polymers are subsequently processed into fibers and films. Some U.S. patents, such as 3,024,220, 3,050,533 and 3,050,548 illustrate various other process improvements of the direct esterification route in preparing linear polyesters.

SUMMARY OF THE INVENTION

Therefore, it is a prime object of this invention to provide an improved process for the direct esterification of a polycarboxylic acid with a polyol. Another object of this invention is to provide an improved process for directly preparing esters having improved properties which can then be conveniently polycondensed into high molecular weight and high quality polyesters or copolyesters suitable for processing into fibers, filaments, films and other shaped articles as a continuous or discontinuous process. Another object of this invention is to provide an improved process for directly preparing esters in the presence of basic buffering agents which yield improved properties to said esters which can then be conveniently polydensed into high molecular weight and high quality polyesters or copolyesters suitable for processing into fibers, filaments, films and other shaped articles as a continuous or discontinuous process. Other objects will appear hereinafter as the description of the invention proceeds.

The above and other objects of this invention are accomplished in accordance with this invention in which the production of high molecular weight polyesters, particularly the esterification stage thereof is carried out under direct esterification conditions in the presence of ammonia or an ammonium salt of a dibasic carboxylic acid in an amount sufficient to improve the physical properties of the resulting polyester.

In general, the direct esterification in accordance with this invention is carried out with the molecular ratio of the acid to the polyol of from about 1.0 to about 1.0–2.0 and preferably in a mole ratio acid/polyol of from about 1.0 to about 1.1–1.6.

The esterification reaction temperature ranges from about 200° C. and about 300° C. and the reaction is carried out in the absence of an oxygen containing gas at atmospheric or at elevated pressure. The buffering amount of the ammonia or an ammonium salt of a dibasic carboxylic acid present during the esterification reaction step ranges generally from about 0.005 to about 1.0, preferably from about 0.005 to about 0.5 mole per mole of the acid.

When the direct esterification reaction step is complete, any remaining glycol is distilled off. A polycondensation catalyst may then be added, if not added prior to the esterification step. Such catalysts are, for example, the compounds of antimony as antimony oxide, lead oxide, sodium alcoholate, lithium hydride, zinc acetate and zinc acetylacetonate as well as others. They are generally utilized in small amounts, such as from about 0.005 to about 1.6% based on the weight of the reactants. The condensation or polymerization reaction is usually carried out at a reduced pressure which can be as low as 0.1 torr and a temperature of from about 260° C. to about 300° C. The condensation or polymerization is carried out under these conditions for periods of from about 1.5 to about 10 hours, preferably from about 2 to about 6 hours until a polymerized polyester product of the requisite molecular weight, as determined by viscosity or other convenient physical measurement, is obtained. The duration of the condensation depends upon the predetermined polymerization conditions, such as, batch or continuous process, temperature and pressure profiles, catalyst concentration, surface generation conditions, etc. Continuous agitation, when the polymerization mass is a continuous process gives maximum exposure to the vacuum which further assists in removing any unreacted glycol and other by-products.

Various additives can be added with the polycarboxylic acid and polyol feed or during the direct esterification reaction in order to further control the reactions and tailor the characteristics or physical properties of the final polymer as required for specific end uses. For example, if fatigue resistance is desirable a small amount of diphenylene phenylene diamine can be added. Other well known additives can be used to further enhance and/or control such characteristics of the finished polymer as heat and light stability, flammability, adhesion, luster, dye affinity, static dissipation, etc. Other frequency used additives are non-reactive and heterogeneous polymers, pigments, brighteners, fluorescent agents, dyestuff precursors and assistants and the like. Reaction control additives such as the aforementioned polycondensation catalysts and chain terminators can also be added with the polycarboxylic acid-polyol feed or during the direct esterification.

PREFERRED EMBODIMENTS

The following examples, in which all parts are by weight unless otherwise specified, are given to further illustrate the invention.

EXAMPLE 1

A mixture containing 4.12 gms. of ammonium terephthalate (0.0206 mole), 830 gms. of terephthalic acid (5.0 moles) and 465 gms. of ethylene glycol (7.5 moles) was charged to a one gallon autoclave equipped with a nitrogen sparger and a distillation arm. After flushing with nitrogen the reactor was electrically heated to 270° C. (wall temperature). The pressure was maintained at no more than 75 p.s.i.g. by controlled blending through the distillation arm. A distillate of a water-ethylene glycol solution was recovered. When bleeding off distillate was no longer required to keep the pressure below 75 p.s.i.g. (about 2½ hours) the pressure was reduced to atmospheric, distilling off more glycol. The prepolymer was then extruded out the bottom of the reactor. This prepolymer was analyzed for carboxyl end groups, diethylene glycol content and intrinsic viscosity, prepolymer mixed in phenol/tetrachloroethane (P/TCE). Fifty grams of the prepolymer was ground and placed in a 500 ml. flask. The flask was connected to a Rinco rotary evaporator, put under 0.4 mm. absolute pressure and partially submerged in a salt bath at 290° C. for 3 hours. The polymer was analyzed for P/TCE intrinsic viscosity and diethylene glycol content.

The following table sets forth conditions and results of various reactions using the above described ingredients and reactants as well as others and carried out substantially as described above.

1,3-cyclobutane dimethanol and mixtures thereof. The more preferred glycols, however, are the low molecular weight glycols which contain 2 to about 4 carbon atoms since they produce highly polymerized esters having high melting points. This invention can also be used to prepare copolyesters by reacting one or more acids with one or more of the glycols.

From the foregoing discussion, description and data, it is easily observable that the present invention provides a significant contribution in the art of preparing high molecular weight polyesters and copolyesters suitable for use in the preparations of fibers, filaments and films. While the invention has been described with regard to specific detail, it will be appreciated that changes can be made without departing from its scope.

We claim:

1. A process for the preparation of the stable high molecular weight aryl polyesters and copolyesters which comprises esterifying an aromatic dicarboxylic acid with an alkylene glycol containing 2 to about 10 carbon atoms per molecule under direct esterification conditions in the presence of ammonia or an ammonium salt of a dibasic carboxylic acid or ammonium carbonate.

2. The process of claim 1 wherein the temperature of

TABLE I

| | Esterification | | | | | |
|---|---|---|---|---|---|---|
| | Prepolymer | | | Polymer | | |
| Additive | I.V. | COOH (meq./kg.) | DEG/EG (wt. ratio) | I.V. | COOH (meq./kg.) | DEG/EG (wt. ratio) |
| None | 0.10 | 328 | 0.74 | 0.88 | 32 | 0.12 |
| Antimony tristallate | 0.11 | 179 | 0.132 | 0.93 | 35 | 0.13 |
| Ammonium terephthalate | 0.09 | 236 | 0.060 | 0.82 | 30 | 0.08 |
| Ammonium terephthalate plus antimony tristallate | 0.09 | 114 | 0.07 | 0.90 | 20 | 0.06 |
| Ammonium hydroxide | 0.09 | 306 | 0.057 | 0.82 | 29 | 0.07 |
| Ammonium hydroxide plus antimony tristallate | 0.11 | 243 | 0.062 | 0.88 | 25 | 0.06 |
| Ammonium carbonate plus antimony tristallate | 0.09 | 161 | 0.70 | 0.91 | 38 | 0.08 |
| Ammonium carbonate | 0.08 | 293 | 0.083 | 0.85 | 33 | 0.07 |

This table illustrates that ammonia, ammonium terephthalate and ammonium carbonate with and without the use of antimony tristallate when used as esterification buffering agents produce polymers having improved properties, particularly low ether groups such as diethylene glycol content, in accordance with this invention. The propolymers which are highly esterified can be polycondensed to a polyester polymer of molecular weight sufficiently high so as to be useful in the preparation of fibers and film having especially low diethylene glycol content. The testing used to determine the above characteristics was carried out using conventional procedures.

Many advantages are obtained through the use of this process. The buffering agents of this invention are reasonable in cost and can be used with conventional equipment and procedures in the preparation of the polymers, and yield an improved polymer that is highly useful in the preparation of shaped articles such as fibers and film.

The invention has been illustrated particularly with respect to the use of terephthalic acid and ethylene glycol as reactants. It can also be used to prepare polyesters suitable for use in the preparation of fibers, filaments and films from other acids and other polyols. For example, other acids and anhydrides useable are naphthalene dicarboxylic acid, phthalic acid, isophthalic acid, phthalic anhydride, p,p'-diphenyl dicarboxylic acid, hexahydroterephthalic acid, succinic acid, adipic acid, sebacic acid and substituted acid, such as 5-sulfo-isophthalic acid. Other polyols useable in accordance with this invention are the linear and alicyclic alkylene glycols having 2 to 10 carbon atoms per molecule. Such glycols include propylene glycol, butylene glycol, trimethylene glycol, tetramethylene glycol, decamethylene glycol, 1,4-cyclohexane dimethanol, the direct esterification is maintained between about 200° C. and 300° C. and the pressure is maintained between about atmospheric and about 250 p.s.i.g.

3. The process of claim 1 wherein the aromatic dicarboxylic acid is selected from the group consisting of terephthalic acid, isophthalic acid and naphthalene dicarboxylic acid.

4. The process of claim 1 wherein the alkylene glycol is ethylene glycol.

5. The process of claim 1 wherein the ammonium salt of a dibasic carboxylic acid is selected from the group consisting of ammonium terephthalate and hexahydroterephthalic acid.

6. The process of claim 1 wherein the aromatic dicarboxylic acid is terephthalic acid, the alkylene glycol is ethylene glycol and the ammonium salt of a dibasic carboxylic acid is ammonium terephthalate.

7. The process of claim 1 wherein the aromatic dicarboxylic acid is terephthalic acid, the alkylene glycol is ethylene glycol and wherein the direct esterification conditions are carried out in the presence of ammonium carbonate.

8. The process of claim 1, wherein the aromatic dicarboxylic acid is terephthalic acid, the alkylene glycol is ethylene glycol and wherein the direct esterification conditions are carried out in the presence of ammonia.

9. The process of claim 1 wherein the molar ratio of said acid to said glycol is 1.0:1.0–2.0.

10. The process of claim 7 wherein the molar ratio of said acid to said glycol is 1.0:1.1–1.6.

11. The process of claim 1 wherein the basic compound is present in the amount of about 0.005 to 1.0 mole percent of the acid.

12. The process of claim 9 wherein the basic compound is present in the amount of about 0.005 to 0.5 mole percent of the acid.

References Cited

UNITED STATES PATENTS

| | | | |
|---|---|---|---|
| 2,926,189 | 2/1960 | Hadley et al. | 260—475 |
| 3,060,152 | 10/1962 | Ringwald | 260—75 |
| 3,479,324 | 11/1969 | Carter et al. | 260—75 |

FOREIGN PATENTS

| | | |
|---|---|---|
| 782,036 | 8/1957 | Great Britain. |
| 1,044,782 | 10/1966 | Great Britain. |

MELVIN GOLDSTEIN, Primary Examiner

U.S. Cl. X.R.

260—475